(12) United States Patent
Li

(10) Patent No.: US 6,465,588 B1
(45) Date of Patent: Oct. 15, 2002

(54) FOUR COMPONENT COPOLYMERS AND THE OCULAR LENS MADE THEREOF

(75) Inventor: Fumian Li, 47-108, Zhongguanyuan, Haidian District, Beijing 100871 (CN)

(73) Assignees: Santen Pharmaceutical Co., Ltd., Osaka (JP); Fumian Li, Beijing (CN)

( * ) Notice: Subject to any disclaimer, the term of this patent is extended or adjusted under 35 U.S.C. 154(b) by 0 days.

(21) Appl. No.: 09/509,445

(22) PCT Filed: Nov. 7, 1998

(86) PCT No.: PCT/CN98/00212

§ 371 (c)(1), (2), (4) Date: Mar. 28, 2000

(87) PCT Pub. No.: WO99/18139

PCT Pub. Date: Apr. 15, 1999

(30) Foreign Application Priority Data

Oct. 7, 1997 (CN) ........................................ 97119353 A

(51) Int. Cl.[7] ................................................. C08F 26/06
(52) U.S. Cl. .................... 526/258; 526/320; 526/328.5; 623/6; 351/160; 524/359; 524/558
(58) Field of Search ................................ 526/258, 320, 526/328.5; 623/6; 351/160; 524/359, 558

(56) References Cited

U.S. PATENT DOCUMENTS 4,123,407 A   10/1978  Gordon
4,956,432 A    9/1990  Vacik et al.
6,132,462 A *  10/2000  Li ............................... 623/6.11

FOREIGN PATENT DOCUMENTS

| AU | 618077 | 8/1989 |
|----|--------|--------|
| JP | 53-105250 | 9/1978 |
| JP | 2-8218 | 1/1990 |
| JP | 2-43208 | 2/1990 |
| JP | 4-28705 | 1/1992 |
| JP | 5-80279 | 4/1993 |
| JP | 5-150197 | 6/1993 |
| JP | 9-146052 | 6/1997 |
| JP | 9-179073 | 7/1997 |
| WO | WO 97/23523 | 7/1997 |
| WO | WO9723523 | * 7/1997 |

* cited by examiner

*Primary Examiner*—David W. Wu
*Assistant Examiner*—William K Cheung
(74) *Attorney, Agent, or Firm*—Frishauf, Holtz, Goodman & Chick, P.C.

(57) ABSTRACT

A hydrophilic copolymer which is suitable for the production of an ocular lens such as an intraocular lens or a contact lens, and which is particularly suitable for a foldable intraocular lens, and also an intraocular lens made therefrom.

62 Claims, No Drawings

US 6,465,588 B1

FOUR COMPONENT COPOLYMERS AND THE OCULAR LENS MADE THEREOF

TECHNICAL FIELD

This invention relates to a hydrophilic copolymer, or hydrogel, which is suitable for the production of ocular lens such as intraocular lens, contact lens or the like, and is particularly suitable for foldable intraocular lens (foldable IOL).

BACKGROUND ART

Intraocular lens (IOL) has been used to replace crystalline lens in cataract surgery. Since IOL was first used in implanting in 1949, various researches have been carried out on IOL materials. With the great evolution of operation methods and advancement of operation methods, demands on the characteristic features of IOL have also changed a lot. Recently, with the popularity of phacoemulsification techniques and the like, it is possible to open a very small incision to remove the opaque crystalline lens, and thus the demands on the characteristic features of implanted IOL have changed gradually. For example, in order to implant IOL through a small incision, the IOL should be in a folded form when implanted and returned to an expanding state in lens capsule, this is the characteristics of the so-called foldable IOL. Herein, various researches have been carried out on IOL materials. Polymethyl methacrylate (PMMA), silicone, acrylic resin and the like have been widely used as IOL materials, while silicone and acrylic acid resin can be used as foldable IOL materials. Recently, copolymers of hydroxyethyl methacrylate, methyl methacrylate and the like have also been used as foldable IOL materials. Moreover, besides the studies on these IOL materials, the following techniques have been adopted in the practical use: an ultra-violet (UV) light absorber such as hydroxybenzophenone or hydroxyphenyl benzotriazole has been added to the IOL materials to avoid the effect of UV light on retina; polysaccharide such as heparin is coated on IOL surface to improve biocompatibility and to avoid cell deposition and the like.

One characteristic of the copolymer according to the present invention is that it contains acrylic monomer having a pyrrolidone group as its structural unit. There have been reports on this kind of polymer, especially those used in ocular lens, such as copolymer of methacryloyl-oxyethyl-2-pyrrolidone and acrylic acid and the like (JP Laid-Open 28705/1992); polymer prepared from monomer which is formed from amidation of acrylic acid and pyrrolidone (JP Laid-Open 43208/1990); polymer of polyoxyalkylene skeleton having a pyrrolidone group (JP Laid-Open 8218/1990) and so on. In particular, as for copolymers prepared from three components or more, only the following several kinds have been disclosed: copolymers prepared from vinyl pyrrolidone and hydroxyethyl methacrylate or methyl methacrylate (JP Laid-Open 105250/1978); copolymer prepared from methacryloyloxyethyl-2-pyrrolidone, alkyl methacrylate and fluoroalkyl methacrylate (JP Laid-Open 150197/1993) and so on. However, these materials were studied mainly for the applications in soft contact lens and not in IOL, the possibility of application in foldable IOL as described in this invention has totally not been suggested.

It is an object of the present invention to provide a kind of ocular lens such as intraocular lens, contact lens and the like, to say in more detail, it is used mainly as foldable intraocular lens (foldable IOL). For the study of foldable IOL materials, their properties including refractive index, surface strength, tensile strength, recovering speed, transparency and the like should be considered. For example:

1) if the refractive index of IOL is too low, the thickness of IOL would increase too much, thus contraction difference of periphery would become over large. So it is necessary for IOL to have a proper refractive index. Specifically, the preferable range of refractive index is 1.4–1.6.
2) because tweezers are used to implant foldable IOL, surface strength and tensile strength of IOL bearing the operation is needed.
3) after foldable IOL is implanted, it must be returned to its original form in lens capsule. Recovering speed can be varied with the difference of habit and ability among operators. In general, the possibility of mechanical invasion of peripheral tissue increases with the increase of recovering speed. On the other hand, with the slowdown of recovering speed, the operation in turn gets longer, the possibility of bad effects on peripheral tissue also increases. Accordingly, suitable recovering speed is needed for foldable IOL.

Moreover, the material should be easily shaped into IOL. Only when the above requirements are satisfied can different kinds of foldable IOLs find practical use, and more preferable material be developed. For example, though the commercially available silicone foldable IOL has suitable refractive index, its recovering speed is too fast; when acrylic foldable IOL is implanted with tweezers, compressive mark or scar may possibly form. The operators must be very skillful when using these two IOLS. In addition, silicone foldable IOL can not resist to damage from laser, is easy to chap and pit, and has the possibility to form white turbidness.

Furthermore, to avoid the effect of UV light on retina, a more preferable material can be obtained if an UV absorber is added, so it is expected to develop a kind of excellent material with both the above mentioned properties and at the same time having the ability to absorb UV light.

The present inventors, with the consideration to solve the above problems, have investigated the more applicable foldable IOL materials, and have found that a four component copolymer prepared from acrylic derivatives having pyrrolidone groups could be used as a kind of particularly excellent IOL material.

DISCLOSURE OF THE INVENTION

The present invention relates to a novel copolymer prepared from the copolymerization of the following monomers a), b), c) and d), to the process for preparing the copolymer, and to the ocular lens thereof.

a)

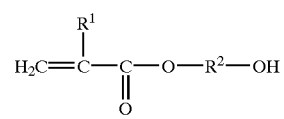

[wherein $R^1$ represents hydrogen or a lower alkyl group; $R^2$ represents a lower alkylene group, which can be replaced by a hydroxyl group, and there can be oxygen in the alkylene group chain. The followings are same.]

b)

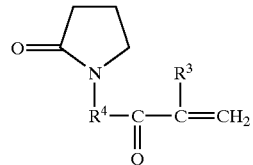

[wherein $R^3$ represents hydrogen or a lower alkyl group; $R^4$ represents the following radicals or a single bond,

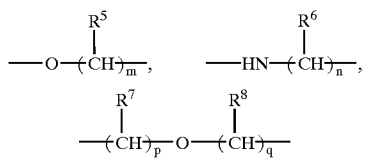

$R^5$, $R^6$, $R^7$ and $R^8$ represent hydrogen or a lower alkyl group, respectively. m, n, p and q are integers of 1 to 4. The followings are same.]

c)

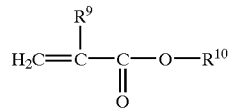

[wherein $R^9$ represents hydrogen or a lower alkyl group; $R^{10}$ represents a lower alkyl group. The followings are same.]

d)

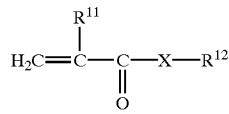

[wherein $R^{11}$ represents hydrogen or a lower alkyl group; $R^{12}$ represents a phenyl lower alkyl group, a naphthyl lower alkyl group, a pyrimidyl group, or a pyrimidyl piperazinyl group. The phenyl ring of the phenyl lower alkyl group and naphthyl ring of the naphthyl lower alkyl group can also be replaced by a lower alkyl group, a lower alkoxy group or a halogen atom. X represents —O—, —NH— or a single bond. The followings are same.]

When structural units are used to represent the copolymers, the copolymers are composed of the following four components: [I], [II], [III] and [IV], wherein the weight ratios are 40–80 for [I], 5–30 for [II], 5–20 for [III] and 5–30 for [IV], respectively.

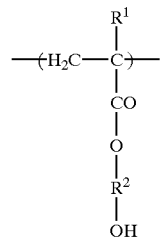

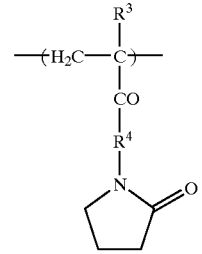

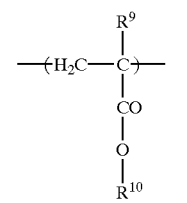

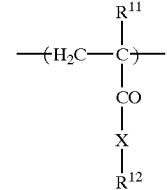

The preferred weight ratios of the said components in copolymers according to the present invention are 50–70 for [I], 10–25 for [II], 5–15 for [III] and 5–20 for [IV].

The said weight ratio of the component is based on the total weight of the copolymer, which is obtained by mixing and polymerizing the described weight of the respective components (monomers).

Following is the detailed description of the above-mentioned groups. The said lower alkyl group is straight or branched chain alkyl groups having 1 to 6 carbon atoms such as methyl, ethyl, propyl, isopropyl, butyl, isobutyl, hexyl and the like; lower alkoxy group is straight or branched chain alkoxy groups having 1 to 6 carbon atoms such as methoxy, ethoxy, propoxy, isopropoxy, butoxy, isobutoxy, hexyloxy and the like; lower alkylene group is straight or branched chain alkylene groups having 1 to 6 carbon atoms such as —$CH_2$—, —$(CH_2)_2$—, —$(CH_2)_3$—, —$CH(CH_3)_2$—, —$(CH_2)_4$—, —$(CH_2)_6$— and the like. The halogen atom is fluorine, chlorine, bromine or the like.

The preferred examples of the above-mentioned groups are that $R^1$ is hydrogen or methyl; $R^2$ is —$(CH_2)_2$— or —$(CH_2)_3$—; $R^3$ is hydrogen or methyl; $R^4$ is —$OCH_2$— or —$OCH_2CH_2$—; $R^9$ is hydrogen or methyl; $R^{10}$ is methyl, $R^{11}$ is hydrogen or methyl, $R^{12}$ is a benzyl, phenethyl or pyrimidyl piperazinyl group.

It is preferable to use the above-mentioned groups in combination. The particularly preferred combination is that $R^2$ is methyl; $R^2$ is —$(CH_2)_2$—; $R^3$ is hydrogen; $R^4$ is —$OCH_2CH_2$—; $R^9$ is methyl; $R^{10}$ is methyl, $R^{11}$ is hydrogen or methyl, $R^{12}$ is a benzyl, phenethyl or pyrimidyl piperazinyl group.

The copolymers according to the present invention can be obtained by copolymerization of monomers a), b), c) and d), polymerization initiators such as potassium persulfate, ammonium persulfate, benzophenone, methacryloyloxy benzophenone and N, N-dimethylaminoehtyl methacrylate are preferably selected singly or in combination to initiate the copolymerization. In general, azobisisobutyronitrile is widely used as a polymerization initiator in copolymer synthesis, but when it is used in the synthesis of foldable IOL materials, which is the application purpose of the present invention, physical strength of the resulted polymer is not satisfactory. The present inventors have made an extensive study on polymerization initiators and have also found that copolymers with satisfying physical strength for IOL material can be obtained by using potassium persulfate, ammonium persulfate, benzophenone, methacryloyloxy benzophenone or N, N-dimethylaminoehtyl methacrylate or a mixture thereof as polymerization initiators.

Moreover, it is preferable that the molecular weight (viscosity-average molecular weight) of the copolymer according to the present invention is ten thousand or higher. In general, molecular weight has no effect on the characteristics of a copolymer, and it is not an important factor, but it has an effect on the physical strength of a copolymer. When the molecular weight is lower than ten thousand, the relationship between the molecular weight and physical strength of a copolymer is nearly linear proportional. But if it is higher than ten thousand, physical strength of the copolymer approaches maximum and the value is almost constant. Accordingly, material with stable physical strength can not be obtained if the molecular weight is ten thousand or lower, and it is likely to be troublesome when the material is used as foldable IOL. But when the molecular weight is higher than ten thousand, there will be few problem. However, if the molecular weight is too high, foldable IOL becomes brittle, which is not anticipated. Accordingly, the preferred range of the molecular weight of the copolymer is from ten thousand to one hundred thousand. The molecular weights of the copolymers in the following examples are just within the above range.

In accordance with the constitution of the present invention, by appropriately selecting the ratio of every structural unit, the properties of the copolymer, such as surface strength, tensile strength, recovering speed, water content and the like, can be designed according to needs. The main roles of each component are as follows:

Component (I) can be obtained from a widely used monomer for polymer synthesis. The monomer is readily available at very low price. This component is an important component of the copolymer according to the present invention. However, this component itself does not play a very important role in determining copolymer properties. Increase of its ratio would increase the hydrophilicity of the copolymer, but it hardly does any effect on refractive index and recovering speed of the copolymer.

Component (II) is one characteristic component of the copolymer according to the present invention. Increase of its ratio would increase the refractive index and hydrophilicity of the copolymer.

Component (III) is also related to the copolymer properties. Increase of its ratio would increase the recovering speed and surface strength of the copolymer; but too much of (III) in the copolymer would result in the decrease of refractive index and hydrophilicity of the copolymer.

Component (IV) is one characteristic component of the copolymer according to the present invention, and increase of its ratio unit is related with the increase of refractive index.

It is possible to obtain the expected foldable IOL through preferable use of these characteristics. The preferable ratio of each component is the same as in the above description. If the preferable ratio is used, an excellent foldable IOL can be obtained. The refractive index of the IOL is 1.4–1.6, the recovering speed is neither too fast nor too slow, i.e. 3–6 seconds; and the surface strength is just the one which would fully bear tweezers operation, that is to say, the surface strength of IOL is 10 psi or higher after it is actually implanted into eyes (in swollen state).

Foldable IOL according to the present invention can fully endure tweezers operation and laser irradiation, which is free from the drawbacks of acrylic foldable IOL, such as the possibility of compressive marks or scars formation when implanted with tweezers. It also avoids the problem of pit formation when exposed to laser, which is the disadvantage of silicone foldable IOL.

Moreover, since the recovering speed can also be adjusted according to the habit of each operator as mentioned above, it can be designed to be 3–6 seconds with 2 seconds variation amplitude.

Foldable IOL can be hydrophobic and hydrophilic, and it is used depending on application purpose. But the copolymers according to the present invention are hydrophilic. Hydrophilic IOL can be circulated and stored in dry state. Before utilization, the "dry" IOL is wetted and swollen in purified water, and then implanted into eyes. Hydrophilic foldable IOL can also be stored in swollen state or wet state. The hydrophilicity of IOL can be deduced according to its water content, and it affects the biocompatibility, flexibility and the like of the foldable IOL. Under the conditions of the present invention, water content can be chosen by selecting the ratio of each structural unit. The preferred range of water content is 15–50%.

The copolymers according to the present invention can be subjected to inter-molecular crosslinking, and their physical strength and water content can be adjusted by crosslinking. The crosslinking agents can be acrylate or acrylamide-based compounds, for example, ethylene glycol bismethacrylate, diethylene glycol bismethacrylate or N,N-methylene bis (acrylamide) and the like. If the amount of crosslinking agent used is too large, the resulted copolymer would become hard, and its recovering speed would become fast, however, the copolymer becomes brittle. The amount of the crosslinking agent used is in the range of 0.01–2% by weight based on the total weight of the monomers (almost equal to the weight of the copolymer), and it is preferably in the range of 0.05–1.5%.

To avoid the effect of UV light on retina, currently, the widely used method is to add an UV absorber in IOL. However, in the present invention, the UV absorber can also be contained as one component of the copolymer. The UV absorbers include, for example, acrylic derivatives containing benzophenone or benzotriazole moieties, among which those with the following structures are preferable, and 4-methacryloyloxy-2-hydroxybenzophenone is particularly preferable.

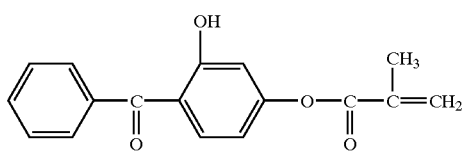

-continued

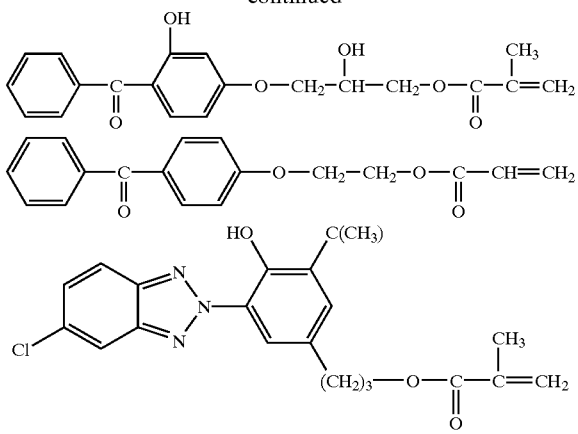

In order to improve the biocompatibility of IOL and to avoid cell deposition and the like, the technique of polysaccharide coating on IOL surface has often been used recently. Because there are free hydroxyl groups on the terminals of the copolymer chains according to the present invention, which can form covalent bonds with polysaccharides, separation of the coatings can be prevented. In addition, the covalent bond can be very readily formed, for example, only divinyl sulfone treatment can be successful. The polysaccharides include, for example, heparin or hyaluronic acid and its salts (sodium salt, potassium salt and the like).

The present invention relates to flexible and soft IOL materials. When IOL is treated with tweezers, tweezers marks would commonly be formed on the IOL surface, and it takes some time for IOL to return to its original shape. However, the copolymers according to the present invention have sufficient surface strength and excellent recovering property, thus the above problems can be solved.

Furthermore, laser can be used to cure secondary cataract and the like. But if it is conducted after IOL implantation, the former silicone IOL would chap and form turbidness, and also has the possibility to damage the transparency and to induce slight denaturalization of the neighboring portions. But when the copolymers according to the present invention are used, the possibility of the above mentioned turbidness formation is very little, transparency of the material can be maintained, in addition, it will hardly lead to any denaturalization of the neighboring portions.

The copolymer according to the present invention can be easily processed in practical shape and be used as foldable IOL. It can be shaped according to the known methods.

The copolymer according to the present invention is particularly suitable for foldable IOL, and their properties are also suitable for soft contact lens.

REFERENCE EXAMPLE (SYNTHESIS OF MONOMERS)

Reference Example 1

Synthesis of 2-(2-Pyrrolidon-1-yl)ethyl Acrylate (PyEA)

Into a solution of 50 mL of 1-(2-hydroxyethyl)-2-pyrrolidone and 85 mL of triethylamine in 150 mL of chloroform, a solution of 50 mL of acryloyl chloride in 100 mL of chloroform was dropped over 2 hours with stirring. The reaction mixture was stirred at 4° C. for 20 hours, then at 50° C. for 2 hours. After being cooled, the solution was filtered and the filtrate was washed with a 15% aqueous sodium carbonate solution and then concentrated under vacuum. The obtained oily material was distilled under vacuum to give the title compound in a yield of 70%.

bp: 112–113° C./0.5Torr; NMR (ppm, TMS, $CDCl_3$): 6.14 (m, 3H); 4.30 (t, 2H); 3.60 (m, 4H); 2.20 (m, 4H). IR (KBr, $cm^{-1}$): 1735, 1676, 1639, 1361.

The following compounds were synthesized by using the similar synthetic procedure as described in Reference Example 1.
2-(2-Pyrrolidon-1-yl)ethyl methacrylate (PyEMA)

bp: 120–122° C./0.5Torr; NMR (ppm, TMS, $CDCl_3$): 6.10 (s, 1H); 5.59 (s, 1H); 4.29 (t, 2H); 3.59 (m, 4H); 2.30 (m, 4H); 1.94 (s, 3H). IR (KBr, $cm^{-1}$): 1735, 1676, 1639, 1361.
(2-Pyrrolidon-1-yl)methyl acrylate (PyMA)

bp: 92–93° C./0.5Torr; NMR (ppm, TMS, $CDCl_3$): 6.34–6.83 (m, 2H); 6.06–6.12 (m, 1H); 5.37 (m, 2H); 3.57–3.69 (m, 2H); 1.91–2.50 (m, 4H). IR (KBr; $cm^{-1}$): 1708, 1639, 1415.
(2-Pyrrolidon-1-yl)methyl methacrylate (PyMMA)

bp: 95–96° C./0.5Torr; NMR (ppm, TMS, $CDCl_3$): 6.13–6.16 (s, 1H); 5.59–5.61 (m, 1H); 5.41 (s, 2H); 3.55 (t, 2H); 1.9–2.43 (m, 4H), 1.96 (m, 3H). IR (KBr, $cm^{-1}$): 1716, 1636, 1420.

Reference Example 2

Synthesis of N-(2-Pyrrolidon-1-ylmethyl)acrylamide (PyMAm)

A mixture of 65.6 g of 1-methoxymethyl-2-pyrrolidone, 75.5 g of acrylarnide, 0.20 g of p-toluene sulfonic acid and 0.20 g of phenothiazine was stirred under $N_2$ atmosphere at 150° C. for 1 hour, during which time the methanol was removed by distillation. The residue was cooled, and recrystallized from acetone to give the title compound in a yield of 40%. mp: 73–74° C.

NMR (ppm, TMS, $CDCl_3$): 7.31 (m, 1H); 6.19–6.31 (m, 2H); 5.56–5.72 (m, 1H); 4.75–4.81 (d, 2H); 3.50–3.66 (t, 2H), 1.91–2.44 (m, 4H). IR (KBr, $cm^{-1}$): 3440, 1680, 1200–1600.

The following compound was synthesized by using the similar synthetic procedure as described in Reference Example 2.
N-(2-Pyrrolidon-1-ylmethyl)methacrylamide (PyMMAm)

mp: 101–102° C.; NMR (ppm, TMS, $CDCl_3$): 6.70 (s, 1H); 5.69 (s, 1H); 5.35 (s, 1H), 4.70–4.80 (d, 2H); 3.45–3.62 (t, 2H), 1.95–2.45 (m, 7H).

Reference Example 3

Synthesis of 1-Acryloyl-2-pyrrolidone (NAPy)

The title compound was synthesized by using the similar procedure as described in Reference Example 1 except that 2-pyrrolidone and acryloyl chloride were used. The yield was 70%.

bp: 85–86° C./0.5Torr; NMR (ppm, TMS, $CDCl_3$): 7.31–7.65 (m, 1H); 6.56–6.59 (m, 1H); 5.74–5.96 (m, 1H); 3.77–3.96 (m, 2H); 2.52–2.73 (m, 2H), 1.85–2.24 (2m, 2H). IR (KBr; $cm^{-1}$): 1737, 1679, 1408.

The following compound was synthesized by using the similar procedure as described in Reference Example 3.
1-Methacryloyl-2-pyrrolidone (NMAPy)

bp: 88–89° C./0.5Torr; NMR (ppm, TMS, $CDCl_3$): 5.28–5.34 (s, 2H); 3.72–3.90 (m, 2H); 2.57–2.67 (m, 2H), 2.00–2.16 (m, 2H), 1.97–1.99 (s, 3H). IR (KBr; $cm^{-1}$): 1745, 1676, 1403.

EXAMPLES (SYNTHESIS OF COPOLYMERS AND PREPARATION OF THE SHEET AND RODS THEREOF)

Example 1

Synthesis of copolymer (HEMA-PyEA-MMA-PEA) from 2-hydroxyethyl methacrylate (HEMA), 2-(2-pyrrolidon-1-yl)ethyl acrylate (PyEA), methyl methacrylate (MMA) and 2-phenylethyl acrylate (PEA), and preparation of sheets or rods thereof.

Copolymer sheets were produced by the polymerization of the monomer mixture in a glass mould. Two glass plates (6×5 cm, previously treated with a silicone sealing agent) were placed together with two gaskets (each 0.5 mm or 0.1 mm thick) separating the plates. Clips were used to hold the mould together. 7 g of HEMA, 2 g of PyEA, 0.5 g of MMA and 1 g of PEA were mixed together with 0.2 g of potassium persulfate and 1.0 g of water to obtain a homogeneous solution. The mixture was then injected into the mould and was subject to radical polymerization at 60° C., for 22 hours followed by 2 hours postcure at 90° C. The clips were removed and, after opening the mould, the copolymer sheet was separated from the glass plates, then placed in purified water to give the desired copolymer sheets. Moreover, the interval between the two glass plates could be chosen according to needs.

The procedure for the preparation of copolymer rods is as follows: The above-mentioned monomer mixture was added into a test tube made of hard glass. The tube was sealed after the mixture being purged with $N_2$ gas to replace the remaining air. Then the tube was heated at 40° C. for 72 hours and at 70° C. for 72 hours. The prepared rods were obtained after the tube being crashed.

The following copolymers and the sheets and rods thereof were prepared according to the same manner as described in Example 1.

HEMA-PyEA-MA-PEA, HEMA-PyEA-MMA-PMA, HEMA-PyEA-MMA-PEMA, HEMA-PyEA-MMA-BzA, HEMA-PyEA-MMA-BzMA, HEMA-PyEA-MMA-BbzA, HEMA-PyEA-MMA-BBzMA, HEMA-PyEA-MMA-NMA, HEMA-PyEA-MMA-NMMA, HEMA-PyEA-MMA-APMP, HEMA-PyEA-MMA-MPMP, HEMA-PyEA-MMA-PMA, HEMA-PyEA-MMA-PMMA, HEMA-PyEMA-MMA-PEA, HEMA-PyMA-MMA-PEA, HEMA-PyMMA-MMA-PEA, HEMA-NAPy-MMA-PEA, HEMA-PyMAm-MMA-PEA, HEMA-PyMMAm-MMA-PEA, HEA-PyEA-MMA-PEA, HPMA-PyEA-MMA-PEA

The above abbreviations represent the following compounds (the followings are same)

HEMA: 2-hydroxyethyl methacrylate
HEA: 2-hydroxyethyl acrylate
HPMA: 2-hydroxypropyl methacrylate
PyEA: 2-(2-pyrrolidon-1-yl)ethyl acrylate
PyEMA: 2-(2-pyrrolidon-1-yl)ethyl methacrylate
PyMA: 2-pyrrolidon-1-ylmethyl acrylate
PyMMA: 2-pyrrolidon-1-ylmethyl methacrylate
NAPy: 1-acryloyl-2-pyrrolidone
PyMAm: N-(2-pyrrolidon-1-ylmethyl)acrylamide
PyMMAm: N-(2-pyrrolidon-1-ylmethyl)methacrylamide
MA: methyl acrylate
MMA: methyl methacrylate
PMA: phenylmethyl acrylate
PEA: 2-phenylethyl acrylate
PEMA: 2-phenylethyl methacrylate
BzA: benzyl acrylate
BzMA: benzyl methacrylate
BBzA: 4-bromobenzyl acrylate
BBzMA: 4-bromobenzyl methacrylate
NMA: 1-naphthylmethyl acrylate
NMMA: 1-naphthylmethyl methacrylate
APMP: N-acryloyl-N'-(2-pyrimidyl) piperazine
MPMP: N-methacryloyl-N'-(2-pyrimidyl) piperazine
PMA: N-(2-pyrimidyl) acrylamide
PMMA: N-(2-pyrirnidyl) methacrylamide These copolymers and their sheets can also be prepared by using the following method as described in Example 2.

Example 2

Synthesis of copolymer (HEMA-PyEA-MMA-PEA) by photo-polymerization and preparation of the sheets thereof.

Copolymer sheets were produced by the polymerization of the monomer mixture in a glass mould. Two glass plates (6×5 cm, previously treated with a silicone sealing agent) were placed together with two gaskets (each 0.5 mm or 0.1 mm thick) separating the plates. Clips were used to hold the mould together. 7 g of HEMA, 2 g of PyEA, 0.5 g of MMA and 1 g of PEA were mixed together with 0.2 g of benzophenone (or 4-methacryloyloxy benzophenone) and 0.4 g of N,N-dimethylaminoethyl methacrylate to obtain a homogeneous solution. The mixture was then injected into the mould and was allowed to photopolymerize by exposing to UV light from a 80 w mercury lamp for 48 hours. The clips were removed and, after opening the mould, the copolymer sheet was separated from the glass plates, then placed in purified water to give the desired copolymer sheets. Moreover, the interval between the two glass plates could be chosen according to needs.

Example 3

Synthesis of copolymer (HEMA-PyEA-MMA-PEA-MAHBP) from 2-hydroxyethyl methacrylate (HEMA), 2-(2-pyrrolidon-1-yl)ethyl acrylate (PyEA), methyl methacrylate (MMA), 2-phenylethyl acrylate (PEA) and additional 4-methacryloyloxy-2-hydroxy benzophenone (MAHBP), and preparation of sheets or rods thereof.

7 g of HEMA, 2 g of PyEA, 0.5 g of MMA, 1 g of PEA and 0.1 g of MAHBP were mixed together with 0.2 g of potassium persulfate and 10 g of water to form a homogeneous solution. Then the same procedure of Example 1 was repeated to obtain the desired copolymer and the sheets or rods thereof.

The following copolymers and their rods or sheets were prepared by using the similar procedure as described in Example 3.

BEMA-PyEA-MMA-BzMA-MAHBP, iEMA-PyEA-MMA-MPMP-MABP, HEMA-PyEA-MMA-PEA-MAHBP, HEMA-PyEA-MMA-PEA-AEHBP, HEMA-PyFEA-MMA-PFA-HBMA,

The above abbreviations represent the following compounds (the followings are same)

MAHBP: 4-methacryloyloxy-2-hydroxy benzophenone
MAPHBP: 4(2-hydroxy-3-methacryloyloxy) propoxy-2-hydroxy benzophenone
AEHBP: 4-(2-acryloyloxy) ethoxy-2-hydroxy benzophenone
HBMAT: 2-[2-hydroxy-3-t-butyl-5-(3-methacryloyloxy) propyl]-5-chloro-2H-benzotriazole.

Example 4

Synthesis of cross-linked copolymer and preparation of the sheets or rods thereof The same procedure of Example 1 was repeated, except that 0.01 g of ethylene glycol bismethacrylate (EGBMA) was added into the monomer mixture as described in Example 1 or Example 3 before radical polymerization was canied out. The inter-molecular cross-linked copolymer and its sheets or rods were thus obtained.

Instead of EGDMA, dimethacrylate such as diethylene glycol bismethacrylate (DEGMA), and bisacrylamide such as N,N'-methylene bis(acrylamide) can be used as cross-linking agents. Moreover, the content of ross-linking agent can be chosen according to needs.

The physicochemical properties of the copolymers prepared in Example 1 or Example 4 are shown in Table 1.

TABLE 1

| No | HEMA | PyEA | MMA | PEA | BzMA | MPMP | Refractive Index Dry | Refractive Index Wet |
|---|---|---|---|---|---|---|---|---|
| 1 | 70 | 20 | 5 | 10 | — | — | 1.52 | 1.47 |
| 2 | 70 | 20 | 5 | 5 | — | — | 1.51 | 1.46 |
| 3 | 70 | 20 | 10 | 5 | — | — | 1.51 | 1.46 |
| 4 | 70 | 20 | 5 | — | 5 | — | 1.52 | 1.46 |
| 5 | 67 | 19 | 5 | — | 10 | — | 1.52 | 1.47 |
| 6 | 67 | 19 | 10 | — | 5 | — | 1.52 | 1.47 |
| 7 | 64 | 18 | 9 | — | 9 | — | 1.52 | 1.46 |
| 8 | 64 | 18 | 9 | — | — | 9 | 1.52 | 1.45 |
| 9 | 60 | 10 | 10 | — | — | 20 | 1.53 | 1.46 |
| 10* | 60 | 10 | 10 | — | — | 20 | 1.52 | 1.45 |
| 11 | 55 | 9 | 9 | — | — | 27 | 1.53 | 1.46 |
| 12 | 50 | 20 | 10 | — | — | 20 | 1.53 | 1.46 |
| 13* | 50 | 20 | 10 | — | — | 20 | 1.53 | 1.46 |

*No. 10 and No. 13 are uncrosslinked copolymers, and others were cross-linked with 0.1 wt % of ethylene glycol bismethacrylate.

The refractive indices listed in Table 1 were measured with an Abbe refractometer, the so-called "dry" denotes the value of copolymers prior to hydration, while "wet" denotes the value of copolymers after being soaked and swollen to a equilibrium state.

The equilibrium water content (EWC), surface strength, tensile strength and recovering speed of these copolymers are within the range of required value. They were measured by the following methods.

Equilibrium water content (EWC): disc-like sample was cut from a copolymer sheet, and the sample was allowed to equilibrate in water at room temperature for 2 days or more. After surface water had been wiped off, the sample was weighed as W1. Then the sample was dehydrated under vacuum at 60° C. for 48 hours to achieve a constant weight, the dry sample was weighed as W2.

EWC is calculated using the following equation:

$$EWC=(W1-W2)/W2$$

Tensile strength was measured at 12 cm/min tensile speed with YQ-Z-7 equipment.

Recovering speed: samples (3.0×3.0 cm) were cut from water equilibrated copolymer. The sample was first folded with tweezers, then tweezers was removed, and the recovering speed was determined as the time required for the folded state to return to its original state.

Example 5

Modification of Copolymer Surface with Polysaccharide

The copolymer prepared in Example 1 or 3 was put into a 5% aqueous heparin solution for 24 hours, followed by drying in air for 1 hour. Then the copolymer was dipped into a sodium carbonate buffer solution (pH 11) containing 0.1% of divinyl sulfone at 40° C. for 2 hours, washed with a phosphate buffer solution, and finally washed fully with water. The copolymer with covalent bonds between hydroxyl group and heparin was thus obtained.

Instead of heparin, sodium hyaluronate can also be used as polysaccharide and the similar copolymer can be obtained.

Industrial Applicability

The present invention can provide a novel copolymer, which is suitable for the production of ocular lens, particularly suitable for foldable IOL.

The advantages of the copolymers are summarized as the following:

(1) Exhibit fast recovering property from the folded state.
(2) Exhibit ideal refractive index.
(3) Show excellent surface strength and tensile strength.
(4) Expected property can be obtained through changing composition ratio of each monomer.
(5) No compressive mark or scar can be seen even after operation with tweezers.
(6) Protect the retina from the damage of UV light.
(7) Resist to laser treatment.
(8) The synthesized copolymer can be hydrated due to the existence of hydroxyl and pyrrolidone groups within the molecule.
(9) The copolymer surface can easily be modified with polysaccharide through formation of covalent bond, so polysaccharide would not be separated from the copolymer surface.
(10) Inter-molecular cross-linking can easily be carried out.

What is claimed is:

1. A copolymer which comprises the following structural units [I], [II], [III] and [IV], wherein the weight ratios of each structural unit are 40–80 for [I], 5–30 for [II], 5–20 for [III] and 5–30 for [IV]:

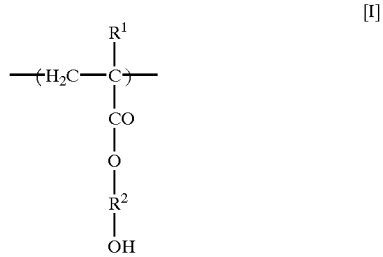

wherein $R^1$ represents hydrogen or a lower alkyl group; $R^2$ represents a lower alkylene group having an alkylene chain, which optionally is replaced by a hydroxyl group or optionally includes an oxygen in the alkylene chain;

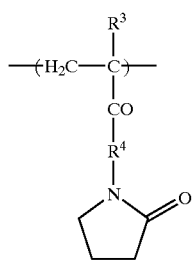

wherein $R^3$ represents hydrogen or a lower alkyl group; $R^4$ represents a single bond or a radical selected from the group consisting of

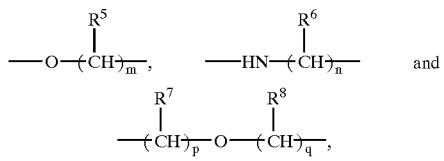

wherein $R^5$, $R^6$, $R^7$ and $R^8$ represent hydrogen or a lower alkyl group; m, n, p and q are integers of 1 to 4;

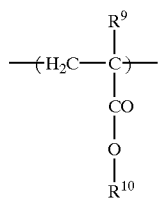

wherein $R^9$ represents hydrogen or lower alkyl group; $R^{10}$ represents a lower alkyl group;

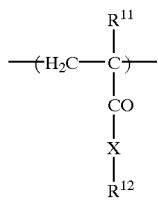

wherein $R^{11}$ represents hydrogen or a lower alkyl group; $R^{12}$ represents a phenyl lower alkyl group, a naphthyl lower alkyl group, a pyrimidyl group, or a pyrimidyl piperazinyl group; X represents —O—, —NH— or a single bond.

2. The copolymer of claim 1, wherein the weight ratios of the four structural units are 50–70 for [I], 10–25 for [II], 5–15 for [III] and 5–20 for [IV], respectively.

3. The copolymer of claim 1, wherein the molecular weight is 10,000–100,000.

4. The copolymer of claim 1, wherein $R^1$ is hydrogen or methyl, and $R^2$ is —(CH$_2$)$_2$— or —(CH$_2$)$_3$—.

5. The copolymer of claim 1, wherein $R^3$ is hydrogen or methyl, and $R^4$ is —OCH$_2$— or —OCH$_2$CH$_2$—.

6. The copolymer of claim 1, wherein $R^9$ is hydrogen or methyl, and $R^{10}$ is methyl.

7. The copolymer of claim 1, wherein $R^{11}$ is hydrogen or methyl, and $R^{12}$ is a benzyl, phenethyl or pyrimidyl piperazinyl group.

8. The copolymer of claim 1, wherein $R^1$ is hydrogen or methyl, $R^2$ is —(CH$_2$)$_2$— or —(CH$_2$)$_3$—, $R^3$ is hydrogen or methyl, $R^4$ is —OCH$_2$— or —OCH$_2$CH$_2$—, $R^9$ is hydrogen or methyl, $R^{10}$ is methyl, $R^{11}$ is hydrogen or methyl, and $R^{12}$ is a benzyl, phenethyl or pyrimidyl piperazinyl group.

9. The copolymer of claim 1, which is prepared by crosslinking with an acrylate or acrylamide-based crosslinking agent.

10. The copolymer of claim 9, wherein the crosslinking agent is selected from ethylene glycol bismethacrylate, diethylene glycol bismethacrylate and N,N'-methylene bis (acrylamide) and it is used in an amount of 0.01–2% by weight based on the total weight of the copolymer components.

11. The copolymer of claim 9, wherein the amount of the crosslinking agent is 0.05–1.5% by weight based on the total weight of the copolymer components.

12. The copolymer of claim 1, which further comprises an UV absorber.

13. The copolymer of claim 12, wherein said UV absorber is a benzophenone or benzotriazole-based UV absorber.

14. The copolymer of claim 12, wherein said UV absorber has an acrylic residue and is incorporated into the copolymer as one component of the copolymer.

15. The copolymer of claim 12, wherein said UV absorber is 2-hydroxy-4-methacryloyloxy benzophenone.

16. The copolymer of claim 1, wherein a surface of the copolymer is modified with a polysaccharide.

17. The copolymer of claim 16, wherein said polysaccharide is heparin, hyaluronic acid or a salt thereof.

18. The copolymer of claim 16, wherein said surface is modified by the formation of covalent bonds between the copolymer and the polysaccharide.

19. The copolymer of claim 18, wherein said covalent bond is formed by using divinyl sulfone.

20. An ocular lens which is formed from the copolymer according to claim 1.

21. A foldable ocular lens which is formed from the copolymer according to claim 1.

22. A foldable ocular lens which is formed from the copolymer according to claim 1, and has the following characteristics:

(a) refractive index is 1.4–1.6;

(b) recovering speed from folded state to original state is 3–6 seconds;

(c) in swollen state, the tensile strength is 10 psi or higher.

23. A copolymer which is obtained by copolymerization of the following monomers a), b), c) and d):

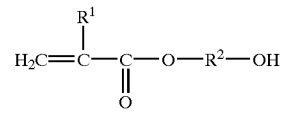

wherein $R^1$ represents hydrogen or a lower alkyl group; $R^2$ represents a lower alkylene group having an alkylene chain, which is optionally replaced by a hydroxyl group or optionally has an oxygen in the alkylene chain;

b)

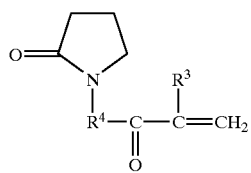

wherein $R^3$ represents hydrogen or a lower alkyl group; $R^4$ represents a single bond or a radical selected from the group consisting of

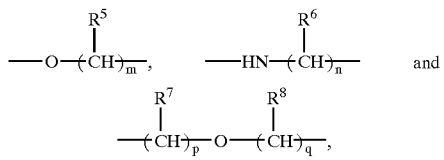

wherein $R^5$, $R^6$, $R^7$ and $R^8$ represent hydrogen or a lower alkyl group; m, n, p and q are integers of 1 to 4;

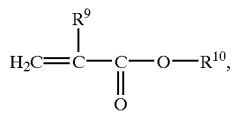

wherein $R^9$ represents hydrogen or a lower alkyl group; $R^{10}$ represents a lower alkyl group;

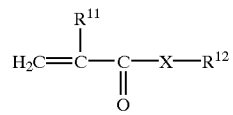

wherein $R^{11}$ represents hydrogen or a lower alkyl group; $R^{12}$ represents a phenyl lower alkyl group, a naphthyl lower alkyl group, a pyrimidyl group, or a pyrimidyl piperazinyl group; X represents —O—, —NH— or a single bond.

24. The copolymer of claim 23, wherein the molecular weight is 10,000–100,000.

25. A process for preparing a copolymer according to claim 23, wherein monomers a), b), c) and d) are copolymerized with a polymerization initiator selected from the group consisting of potassium persulfate, ammonium persulfate, benzophenone, methacryloyloxy benzophenone, N,N-dimethylaminoethyl methacrylate and a mixture thereof.

26. The copolymer of claim 9, which further comprises an UV absorber.

27. The copolymer of claim 26, wherein said UV absorber is a benzophenone or benzotriazole-based UV absorber.

28. The copolymer of claim 26, wherein said UV absorber has an acrylic residue and is incorporated into the copolymer as one component of the copolymer.

29. The copolymer of claim 26, wherein said UV absorber is 2-hydroxy-4-methacryloyloxy benzophenone.

30. The copolymer of claim 9, wherein a surface of the copolymer is modified with a polysaccharide.

31. The copolymer of claim 12, wherein a surface of the copolymer is modified with a polysaccharide.

32. The copolymer of claim 26, wherein a surface of the copolymer is modified with a polysaccharide.

33. The copolymer of claim 30, wherein said polysaccharide is heparin, hyaluronic acid or a salt thereof.

34. The copolymer of claim 31, wherein said polysaccharide is heparin, hyaluronic acid or a salt thereof.

35. The copolymer of claim 32, wherein said polysaccharide is heparin, hyaluronic acid or a salt thereof.

36. The copolymer of claim 30, wherein said surface is modified by the formation of covalent bonds between the copolymer and the polysaccharide.

37. The copolymer of claim 31, wherein said surface is modified by the formation of covalent bonds between the copolymer and the polysaccharide.

38. The copolymer of claim 32, wherein said surface is modified by the formation of covalent bonds between the copolymer and the polysacchardce.

39. The copolymer of claim 36, wherein said covalent bond is formed by using divinyl sulfone.

40. The copolymer of claim 37, wherein said covalent bond is formed by using divinyl sulfone.

41. The copolymer of claim 38, wherein said covalent bond is formed by using divinyl sulfone.

42. An ocular lens which is formed from the copolymer according to claim 9.

43. An ocular lens which is formed from the copolymer according to claim 12.

44. An ocular lens which is formed from the copolymer according to claim 16.

45. An ocular lens which is formed from the copolymer according to claim 26.

46. An ocular lens which is formed from the copolymer according to claim 30.

47. An ocular lens which is formed from the copolymer according to claim 31.

48. An ocular lens which is formed from the copolymer according to claim 32.

49. A foldable ocular lens which is formed from the copolymer according to claim 9.

50. A foldable ocular lens which is formed from the copolymer according to claim 12.

51. A foldable ocular lens which is formed from the copolymer according to claim 16.

52. A foldable ocular lens which is formed from the copolymer according to claim 26.

53. A foldable ocular lens which is formed from the copolymer according to claim 30.

54. A foldable ocular lens which is formed from the copolymer according to claim 31.

55. A foldable ocular lens which is formed from the copolymer according to claim 32.

56. A foldable ocular lens which is formed from the copolymer according to claim 9, and has the following characteristics:
   (a) refractive index is 1.4–1.6;
   (b) recovering speed from folded state to original state is 3–6 seconds;
   (c) in swollen state, the tensile strength is 10 psi or higher.

57. A foldable ocular lens which is formed from the copolymer according to claim 12, and has the following characteristics:
   (a) refractive index is 1.4–1.6;
   (b) recovering speed from folded state to original state is 3–6 seconds;
   (c) in swollen state, the tensile strength is 10 psi or higher.

58. A foldable ocular lens which is formed from the copolymer according to claim 16, and has the following characteristics:
   (a) refractive index is 1.4–1.6;
   (b) recovering speed from folded state to original state is 3–6 seconds;

(c) in swollen state, the tensile strength is 10 psi or higher.

59. A foldable ocular lens which is formed from the copolymer according to claim 26, and has the following characteristics:
  (a) refractive index is 1.4–1.6;
  (b) recovering speed from folded state to original state is 3–6 seconds;
  (c) in swollen state, the tensile strength is 10 psi or higher.

60. A foldable ocular lens which is formed from the copolymer according to claim 30, and has the following characteristics:
  (a) refractive index is 1.4–1.6;
  (b) recovering speed from folded state to original state is 3–6 seconds;
  (c) in swollen state, the tensile strength is 10 psi or higher.

61. A foldable ocular lens which is formed from the copolymer according to claim 31, and has the following characteristics:
  (a) refractive index is 1.4–1.6;
  (b) recovering speed from folded state to original state is 3–6 seconds;
  (c) in swollen state, the tensile strength is 10 psi or higher.

62. A foldable ocular lens which is formed from the copolymer according to claim 32, and has the following characteristics:
  (a) refractive index is 1.4–1.6;
  (b) recovering speed from folded state to original state is 3–6 seconds;
  (c) in swollen state, the tensile strength is 10 psi or higher.

* * * * *